United States Patent
Iwasaki et al.

(10) Patent No.: US 9,012,046 B2
(45) Date of Patent: Apr. 21, 2015

(54) MAGNETIC RECORDING MEDIUM, METHOD OF MANUFACTURING THE SAME, AND MAGNETIC RECORDING/REPRODUCTION APPARATUS

(75) Inventors: Takeshi Iwasaki, Inagi (JP); Kaori Kimura, Yokohama (JP); Hiroyuki Hyodo, Hino (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 429 days.

(21) Appl. No.: 13/294,130

(22) Filed: Nov. 10, 2011

(65) Prior Publication Data

US 2012/0237798 A1     Sep. 20, 2012

(30) Foreign Application Priority Data

Mar. 15, 2011   (JP) ................. 2011-057116

(51) Int. Cl.
*G11B 5/66* (2006.01)
*G11B 5/855* (2006.01)
*G11B 5/73* (2006.01)

(52) U.S. Cl.
CPC ............. *G11B 5/855* (2013.01); *G11B 5/7325* (2013.01)

(58) Field of Classification Search
None
See application file for complete search history.

(56) References Cited

U.S. PATENT DOCUMENTS

| 8,002,997 | B2 | 8/2011 | Kamata et al. |
| 8,213,118 | B2 | 7/2012 | Fukushima et al. |
| 2009/0214898 | A1* | 8/2009 | Hinoue et al. ............ 428/848.5 |
| 2010/0209737 | A1* | 8/2010 | Bian et al. ...................... 428/827 |
| 2010/0214694 | A1* | 8/2010 | Kimura et al. ................. 360/135 |
| 2010/0215991 | A1 | 8/2010 | Kurokawa et al. |
| 2010/0247965 | A1* | 9/2010 | Onoue ........................... 428/800 |
| 2010/0296200 | A1 | 11/2010 | Iwasaki |

FOREIGN PATENT DOCUMENTS

| JP | 2007-220164 | 8/2007 |
| JP | 2008-204539 | 9/2008 |
| JP | 2009-032356 | 2/2009 |
| JP | 2010-272179 | 2/2009 |
| JP | 2010-027122 | 2/2010 |
| JP | 2010-049752 | 3/2010 |

(Continued)

OTHER PUBLICATIONS

Office Action mailed on Jun. 19, 2012 in corresponding Japanese Patent Application No. JP 2011-057116.

(Continued)

*Primary Examiner* — Holly Rickman
*Assistant Examiner* — Lisa Chau
(74) *Attorney, Agent, or Firm* — Knobbe, Martens Olson & Bear, LLP

(57) ABSTRACT

According to one embodiment, a magnetic recording medium is formed by performing gas ion irradiation by using a magnetism deactivating gas on a stack including a perpendicular magnetic recording layer, an Ru nonmagnetic underlayer containing a magnetism deactivating element selected from chromium, titanium, and silicon, and a nonmagnetic substrate. Before gas ion irradiation, the perpendicular magnetic recording layer contains platinum and at least one of iron and cobalt. Gas ion irradiation is performed using nitrogen gas alone or a gas mixture of nitrogen gas and at least one gas selected from the group consisting of helium, hydrogen, and $B_2H_6$.

11 Claims, 3 Drawing Sheets

(56) References Cited

FOREIGN PATENT DOCUMENTS

| | | |
|---|---|---|
| JP | 2010-123178 | 6/2010 |
| JP | 2010-238332 | 10/2010 |
| JP | 2010-244666 | 10/2010 |

OTHER PUBLICATIONS

Japanese Office Action dated Sep. 24, 2013 for JP Application No. 2012-280007.

* cited by examiner

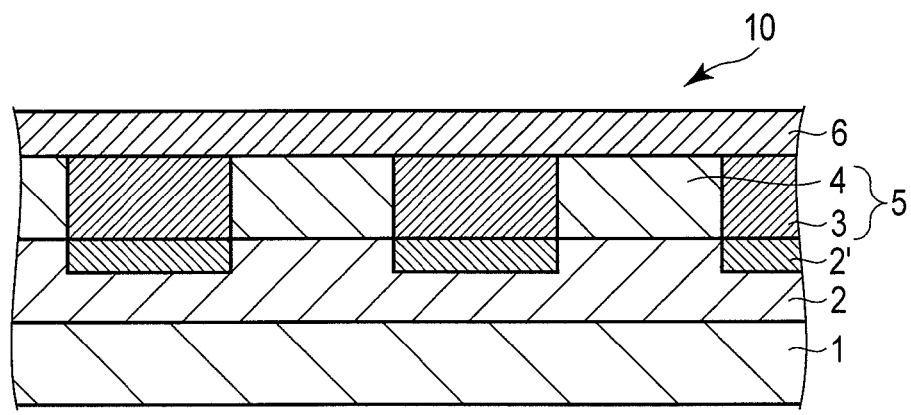
F I G. 1
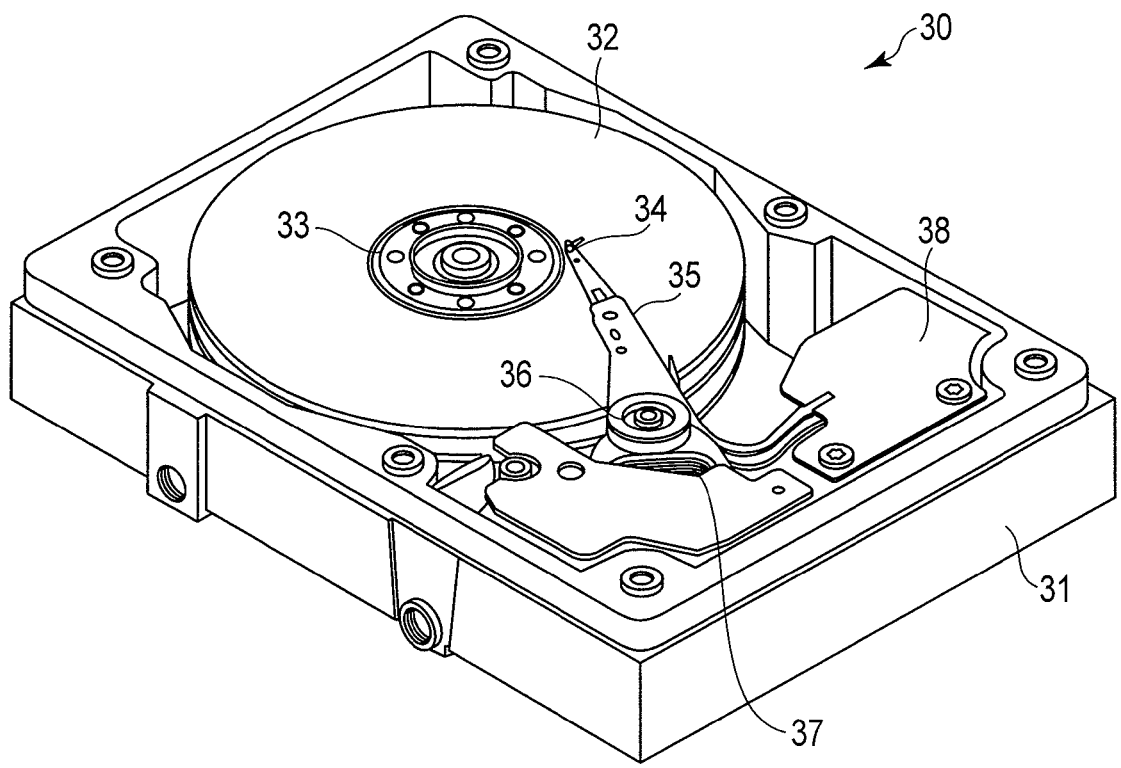
F I G. 2

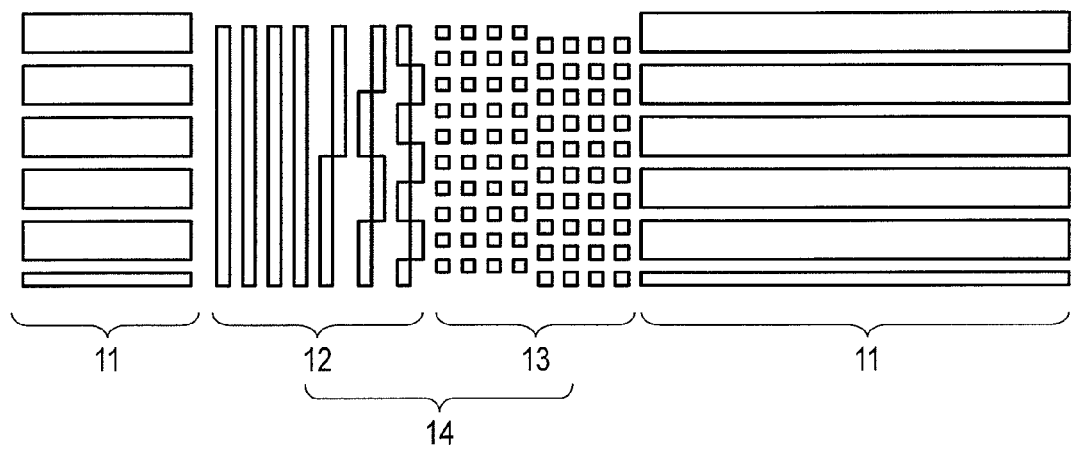
F I G. 4
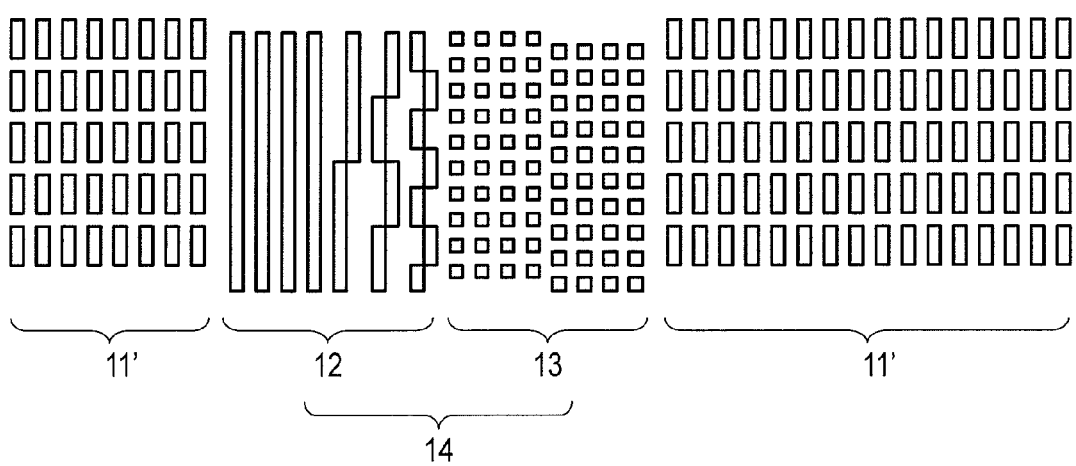
F I G. 5

MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is based upon and claims the benefit of priority from prior Japanese Patent Application No. 2011-057116, filed Mar. 15, 2011, the entire contents of which are incorporated herein by reference.

FIELD

Embodiments described herein relate generally to a magnetic recording medium, a method of manufacturing the same, and a magnetic recording/reproduction apparatus.

BACKGROUND

The need for a high-capacity hard disk drive (HDD) is increasing year by year. A presently prevalent magnetic recording medium has an arrangement in which each layer forming the recording medium is evenly formed on the entire substrate surface. When achieving a recording capacity exceeding 500 Gb/in$^2$, however, adjacent data signals are too close to each other. When recording or reproducing the data signals, therefore, a phenomenon in which nearby data to be neither recorded nor reproduced is read out or written occurs.

Accordingly, patterned media have recently extensively been studied as techniques that avoid the phenomenon as described above and further increase the recording density. The patterned medium has the feature that a magnetic film is processed into predetermined patterns in advance, and a recording/reproduction head records or reproduces information in accordance with the patterns. As the forms of the processed patterns, a discrete track medium (DTM) in which only servo information and recording tracks are processed and data is recorded in the circumferential direction as in the conventional method and a so-called bit patterned medium (BPM) in which not only servo information is processed but also bit patterns are processed in the circumferential direction have been examined.

Since servo information is preformed on the discrete track medium (DTM) and bit patterned medium (BPM) as described above, it is possible to shorten the conventionally required time for magnetically recording the servo information, and reduce the apparatus cost. Also, no magnetic film exists between tracks or magnetization reversal units (bits), so no noise is generated from any magnetic film. This makes it possible to improve the signal quality (signal/noise ratio: SNR), and manufacture a high-density magnetic recording medium and magnetic recording apparatus.

In the DTM and BPM, however, a magnetic film is processed into fine patterns, so the film may be damaged during the processing. As an example, the oxidation of a magnetic element such as Co may deteriorate the magnetic characteristics of the magnetic film, thereby degrading the recording/reproduction characteristics of the medium.

Accordingly, demands have arisen for a simple process that can be implemented while maintaining the recording/reproduction characteristics.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary sectional view showing an example of a magnetic recording medium according to an embodiment;

FIG. 2 is a partially exploded perspective view of a magnetic recording/reproduction apparatus according to the embodiment;

FIG. 4 is a front view showing examples of three-dimensional patterns in which recording tracks and information for positioning a recording/reproduction head are recorded; and FIG. 5 is a front view showing other examples of the three-dimensional patterns in which recording bits and information for positioning a recording/reproduction head are recorded.

DETAILED DESCRIPTION

Figure 3A:
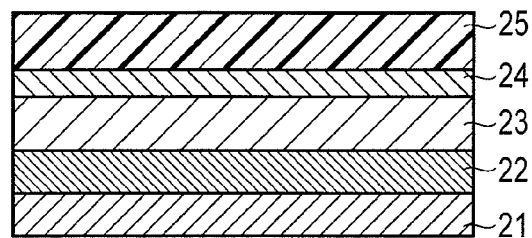
FIGS. 3A, 3B, 3C, 3D, 3E, and 3F are views showing an example of a method of manufacturing the magnetic recording medium according to the embodiment.

Various embodiments will be described hereinafter with reference to the accompanying drawings.

In general, according to one embodiment, a perpendicular magnetic recording medium is formed by stacking, on a nonmagnetic substrate, a nonmagnetic underlayer and a perpendicular magnetic recording layer formed in contact with the nonmagnetic underlayer, forming, on the perpendicular magnetic recording layer, a mask layer having patterns regularly arranged in the longitudinal direction, and performing gas ion irradiation on the stack including the perpendicular magnetic recording layer, nonmagnetic underlayer, and nonmagnetic substrate via the mask layer.

Before gas ion irradiation, the perpendicular magnetic recording layer contains platinum and at least one of iron and cobalt.

Before gas ion irradiation, the nonmagnetic underlayer contains ruthenium and at least one element selected from the group consisting of chromium, titanium, and silicon.

In gas ion irradiation, it is possible to use a gas mixture of nitrogen gas and at least one gas selected from the group consisting of helium, hydrogen, and $B_2H_6$, or nitrogen gas alone.

The perpendicular magnetic recording layer in a region where no mask layer is formed is selectively demagnetized by mixing some components of the perpendicular magnetic recording layer and some components of the nonmagnetic underlayer, thereby forming a non-recording portion containing nitrogen, at least one of iron and cobalt, and at least one element selected from the group consisting of platinum, chromium, titanium, and silicon.

In the perpendicular magnetic recording layer in a region where the mask is formed, a recording portion containing platinum and at least one of iron and cobalt is formed.

In some embodiments, a mixed region of the nonmagnetic underlayer in which at least some components of the perpendicular magnetic recording layer are mixed contains ruthenium, nitrogen, at least one of iron and cobalt, and at least one element selected from the group consisting of platinum, chromium, titanium, and silicon.

In some embodiments, a content of at least one element selected from the group consisting of chromium, titanium, and silicon in the non-recording portion is larger by not less than 5 at % than a content of the element in the recording portion.

In some embodiments, the non-recording portion contains at least one nitride selected from chromium nitride, titanium nitride, and silicon nitride.

In some embodiments, the non-recording portion contains not less than 10 at % of nitrogen.

In some embodiments, a content of at least one element selected from the group consisting of chromium, titanium, and silicon in the mixed region of the nonmagnetic underlayer is smaller by not less than 5 at % than a content of the element in the nonmagnetic underlayer.

Also, a method of manufacturing the perpendicular magnetic recording medium according to the embodiment includes forming, on a nonmagnetic substrate, a nonmagnetic underlayer containing ruthenium and at least one element selected from the group consisting of chromium, titanium, and silicon, forming a magnetic recording layer containing platinum and at least one of iron and cobalt, such that the magnetic recording layer is in contact with the nonmagnetic underlayer, forming, on the magnetic recording layer, a mask layer having patterns regularly arranged in the longitudinal direction, and performing gas ion irradiation on the stack including the magnetic recording layer, nonmagnetic underlayer, and substrate via the mask layer by using nitrogen gas or a gas mixture of nitrogen gas and at least one gas selected from the group consisting of helium, hydrogen, and $B_2H_6$. By this gas ion irradiation, the magnetic recording layer and nonmagnetic underlayer in a region not covered with the mask layer are mixed in the thickness direction and demagnetized. This makes it possible to form, in the magnetic recording layer, a recording portion having regularly arranged patterns and a demagnetized non-recording portion.

In addition, a magnetic recording/reproduction apparatus according to the embodiment includes a perpendicular magnetic recording medium, a mechanism for supporting and rotating the perpendicular magnetic recording medium, a magnetic head including an element for recording information on the perpendicular magnetic recording medium and an element for reproducing recorded information, and a carriage assembly supporting the magnetic head such that it freely moves with respect to the perpendicular magnetic recording medium.

The perpendicular magnetic recording medium to be used in the magnetic recording/reproduction apparatus is formed by stacking, on a nonmagnetic substrate, a nonmagnetic underlayer containing ruthenium and at least one element selected from the group consisting of chromium, titanium, and silicon, and a perpendicular magnetic recording layer formed in contact with the nonmagnetic underlayer and containing platinum and at least one of iron and cobalt, forming, on the perpendicular magnetic recording layer, a mask layer having patterns regularly arranged in the longitudinal direction, and performing gas ion irradiation by using one of nitrogen gas and a gas mixture of nitrogen gas and at least one gas selected from the group consisting of helium, hydrogen, and $B_2H_6$. By this gas ion irradiation, a region of the perpendicular magnetic recording layer which is not covered with the mask layer is demagnetized because at least some components of the perpendicular magnetic recording layer and at least some components of the nonmagnetic underlayer are mixed in the thickness direction, thereby forming a non-recording portion containing nitrogen, at least one of iron and cobalt, and at least one element selected from the group consisting of platinum, chromium, titanium, and silicon. In a region of the perpendicular magnetic recording layer which is covered with the mask layer, a recording portion containing platinum and at least one of iron and cobalt is formed.

In some embodiments, a mixed region of the nonmagnetic underlayer in which at least some components of the perpendicular magnetic recording layer are mixed contains ruthenium, nitrogen, at least one of iron and cobalt, and at least one element selected from the group consisting of platinum, chromium, titanium, and silicon.

In some embodiments, a content of at least one element selected from the group consisting of chromium, titanium, and silicon in the non-recording portion is larger by not less than 5 at % than a content of the element in the recording portion.

In some embodiments, the non-recording portion contains at least one nitride selected from chromium nitride, titanium nitride, and silicon nitride.

In some embodiments, the non-recording portion contains not less than 10 at % of nitrogen.

In some embodiments, a content of at least one element selected from the group consisting of chromium, titanium, and silicon in the mixed region of the nonmagnetic underlayer is smaller by not less than 5 at % than a content of the element in the nonmagnetic underlayer.

In this embodiment, the magnetic recording layer is formed in contact with the Ru nonmagnetic underlayer containing a magnetism deactivating element selected from chromium, titanium, and silicon, and gas ion irradiation is performed, via the mask layer, by using a magnetism deactivating gas selected from $N_2$ and a gas mixture of $N_2$ and one of helium, hydrogen, and $B_2H_6$, thereby mixing the components of the magnetic recording layer and the deactivating element, and demagnetizing the magnetic recording layer. This makes it possible to process the magnetic recording layer into predetermined patterns. In addition, good recording/reproduction characteristics are obtained because the magnetic recording layer is damaged little.

The embodiment will be explained in more detail below with reference to the accompanying drawing.

FIG. 1 is an exemplary sectional view showing an example of the magnetic recording medium according to the embodiment.

As shown in FIG. 1, a magnetic recording medium 10 includes a nonmagnetic substrate 1, a nonmagnetic underlayer 2 formed on the nonmagnetic substrate 1, a perpendicular magnetic recording layer 5 directly formed on the nonmagnetic underlayer 2, and a protective layer 6 formed on the perpendicular magnetic recording layer 5. The perpendicular magnetic recording layer 5 includes recording portions 4, and non-recording portions 3 in which at least some components of the nonmagnetic underlayer 2 are mixed. The nonmagnetic underlayer 2 has mixed regions 2' in which at least some components of the perpendicular magnetic recording layer 5 are mixed.

As the nonmagnetic substrate, it is possible to use, e.g., a glass substrate, an Al-based alloy substrate, a ceramic substrate, a carbon substrate, or an Si single-crystal substrate having an oxidized surface. Examples of the glass substrate are amorphous glass and crystallized glass. Examples of the amorphous glass are general-purpose soda lime glass and aluminosilicate glass. An example of the crystallized glass is lithium-based crystallized glass. Examples of the ceramic substrate are general-purpose sintered products mainly containing aluminum oxide, aluminum nitride, and silicon nitride, and fiber reinforced products of these sintered products. As the nonmagnetic substrate, it is also possible to use a substrate obtained by forming an NiP layer on the surface of any of the metal substrates and non-metal substrates described above by using plating or sputtering.

Although only sputtering will be described below as a method of forming a thin film on the substrate, the same effect can be obtained by using, e.g., vacuum deposition or electroplating.

A soft magnetic underlayer can be formed between the nonmagnetic substrate and nonmagnetic underlayer.

The soft magnetic underlayer (SUL) horizontally passes a recording magnetic field from a single-pole head for magnetizing the perpendicular magnetic recording layer, and returns the magnetic field toward the magnetic head, i.e., performs a part of the function of the magnetic head. The soft magnetic underlayer has a function of applying a sufficiently steep perpendicular magnetic field to the magnetic field recording layer, thereby increasing the recording/reproduction efficiency. A material containing Co, Fe, or Ni can be used as the soft magnetic underlayer. An example of the material is a Co alloy containing Co and at least one of Zr, Hf, Nb, Ta, Ti, and Y. The Co alloy can contain 80 at % or more of Co. When this Co alloy is deposited by sputtering, an amorphous layer readily forms. The amorphous soft magnetic material has none of magnetocrystalline anisotropy, a crystal defect, and a grain boundary, and hence has very high soft magnetism and can reduce the noise of the medium. Examples of the amorphous soft magnetic material are CoZr-, CoZrNb-, and CoZrTa-based alloys. Other examples of the soft magnetic underlayer material are CoFe-based alloys such as CoFe and CoFeV, FeNi-based alloys such as FeNi, FeNiMo, FeNiCr, and FeNiSi, FeAl- and FeSi-based alloys such as FeAl, FeAlSi, FeAlSiCr, FeAlSiTiRu, and FeAlO, FeTa-based alloys such as FeTa, FeTaC, and FeTaN, and FeZr-based alloys such as FeZrN. It is also possible to use a material having a microcrystalline structure or a granular structure in which fine crystal grains are dispersed in a matrix. Examples are FeAlO FeMgO, FeTaN, and FeZrN containing 60 at % or more of Fe.

Furthermore, in order to prevent spike noise, it is possible to divide the soft magnetic underlayer into a plurality of layers, and insert a 0.5- to 1.5-nm thick nonmagnetic dividing layer, thereby causing antiferromagnetic coupling. In this case, it is possible to use, e.g., Ru, an Ru alloy, Pd, Cu, or Pt.

The soft magnetic layer may also be exchange-coupled with a pinned layer made of a hard magnetic film having longitudinal anisotropy such as CoCrPt, SmCo, or FePt, or an antiferromagnetic material such as IrMn or PtMn. To control the exchange coupling force, it is possible to stack magnetic films (e.g., Co) or nonmagnetic films (e.g., Pt) on the upper and lower surfaces of the nonmagnetic dividing layer.

An adhesion layer can further be formed below the soft magnetic underlayer in order to improve the adhesion to the substrate. As the material of this adhesion layer, it is possible to use Ti, Ta, W, Cr, Pt, an alloy containing any of these elements, or an oxide or nitride of any of these elements.

In the embodiment, the nonmagnetic underlayer is formed between the soft magnetic layer and magnetic recording layer, so that the nonmagnetic underlayer is in contact with the magnetic recording layer.

The nonmagnetic underlayer has two functions, i.e., interrupts the exchanging coupling interaction between the soft magnetic underlayer and perpendicular magnetic recording layer, and controls the crystallinity of the recording layer. An Ru alloy can be used as the material of the nonmagnetic underlayer. This Ru alloy contains at least one element selected from Ti, Cr, and Si. It is also possible to use a multilayered structure including an Ru alloy layer and Ru layer. In this case, the Ru layer must be formed on the substrate side, and the Ru alloy layer must be formed in contact with the perpendicular magnetic recording layer.

At least one element selected from Ti, Cr, and Si is used in the Ru alloy because high crystallinity required for the underlayer can be obtained, the epitaxial properties with respect to the perpendicular magnetic recording layer improve, and it is possible to deactivate the magnetism of the perpendicular magnetic recording layer by mixing Ti, Cr, or Si with the perpendicular magnetic recording layer. The amount of Ti, Cr, or Si to be added to Ru is desirably 10 (inclusive) to 50 (inclusive) at %. If the addition amount is less than 10 at %, the magnetism deactivating effect becomes unsatisfactory when mixing Ti, Cr, or Si with the perpendicular magnetic recording layer, and it is impossible to sufficiently deactivate the magnetism of the perpendicular magnetic recording layer. If the addition amount exceeds 50 at %, the crystal orientation as the nonmagnetic underlayer becomes insufficient, and the orientation of the perpendicular magnetic recording layer immediately above the nonmagnetic underlayer also worsens. The film thickness of the nonmagnetic underlayer can be 5 to 24 nm, and further can be 16 nm or less. When the film thickness of the underlayer is small, the distance between a magnetic head and the soft magnetic backing layer decreases. This makes it possible to obtain a sharp magnetic flux from the magnetic head, and improve the ease of signal write. If the film thickness of the underlayer is less than 5 nm, the crystal orientation worsens. On the other hand, if the film thickness exceeds 24 nm, a spacing loss is produced, and the recording/reproduction characteristics worsen.

An orientation control layer can further be formed between the nonmagnetic underlayer and soft magnetic layer.

The orientation control layer controls the crystal orientation and crystal grain size of the nonmagnetic underlayer immediately above the orientation control layer or the perpendicular magnetic recording layer. As the orientation control layer, it is possible to use one of an Ni alloy, Pt alloy, Pd alloy, Ta alloy, Cr alloy, Si alloy, and Cu alloy. When using these alloys, it is possible to improve the crystal orientation and decrease the crystal grain size. A predetermined element may also be added in order to increase the matching of the crystal lattice size to that of the underlayer. Examples of an element to be added to decrease the crystal size are B, Mn, Al, Si oxide, and Ti oxide. Examples of an element to be added to increase the matching of the crystal lattice size to that of the underlayer are Ru, Pt, W, Mo, Ta, Nb, and Ti. The film thickness of the orientation control layer can be 1 (inclusive)

to 10 (inclusive) nm. If the film thickness of the orientation control layer is less than 1 nm, the effect as the orientation control layer becomes unsatisfactory. As a consequence, no grain downsizing effect can be obtained, and the crystal orientation worsens. If the film thickness of the orientation control layer exceeds 10 nm, a spacing loss is produced, and the crystal grain size increases. The orientation control layer can also be formed by a plurality of layers instead of a single layer. In this case, the film thickness of the whole orientation control layer can be 2 (inclusive) to 15 (inclusive) nm. If the film thickness is less than 2 nm, the effect as the orientation control layer becomes unsatisfactory. If the film thickness of the whole orientation control layer exceeds 15 nm, the spacing loss cannot be ignored any longer, and the recording/reproduction characteristics worsen.

The perpendicular magnetic recording layer to be used in the embodiment contains Co or Fe as a main component, and can contain Pt. The perpendicular magnetic recording layer can also contain, as needed, one or more elements selected from Cr, Ru, Mn, B, Ta, Cu, and Pd, or an oxide. Favorable oxides are silicon oxide, titanium oxide, and chromium oxide. As the perpendicular magnetic recording layer, it is also possible to use, e.g., any of a CoPt-based alloy, an FePt-based alloy, a CoCrPt-based alloy, an FePtCr-based alloy, CoPtO, FePtO, CoPtCrO, FePtCrO, CoPtSi, and FePtSi, or a multilayered structure containing Co and an alloy mainly containing at least one element selected from the group consisting of Pt, Pd, and Cu.

The thickness of the perpendicular magnetic recording layer is, e.g., 3 to 30 nm, and more specifically, 5 to 15 nm. When the thickness falls within this range, a magnetic recording/reproduction apparatus suited to a high recording density can be manufactured. If the thickness of the perpendicular magnetic recording layer is less than 3 nm, the reproduction output becomes too low, so the noise component becomes higher than the reproduction output. If the thickness of the perpendicular magnetic recording layer exceeds 30 nm, the reproduction output becomes too high and distorts the waveform. The coercive force of the perpendicular magnetic recording layer can be 237,000 A/m (3,000 Oe) or more. If the coercive force is less than 237,000 A/m (3,000 Oe), the thermal decay resistance decreases. The perpendicular squareness ratio of the perpendicular magnetic recording layer can be 0.8 or more. If the perpendicular squareness ratio is less than 0.8, the thermal decay resistance decreases.

The Pt content in the perpendicular magnetic recording layer can be 10 (inclusive) to 25 (inclusive) at %. When the Pt content falls within the above range, a uniaxial magnetocrystalline anisotropy constant (Ku) necessary for the perpendicular magnetic recording layer is obtained, the crystallinity and orientation of the magnetic grains improve, and as a consequence thermal decay characteristics and recording/reproduction characteristics suited to high-density recording are obtained. If the Pt content exceeds the above range or is less than the above range, it is difficult to obtain Ku sufficient for thermal decay characteristics suited to high-density recording. The Cr content in the perpendicular magnetic recording layer can be 0 (inclusive) to 20 (inclusive) at %, and more specifically, 5 (inclusive) to 15 (inclusive) at %. When the Cr content falls within the above range, high magnetization is maintained without excessively decreasing the Ku of the magnetic grains, and as a consequence recording/reproduction characteristics suited to high-density recording and sufficient thermal decay characteristics are obtained. If the Cr content exceeds the above range, the thermal decay characteristics worsen because the Ku of the magnetic grains decreases, and the crystallinity and orientation of the magnetic grains worsen. Consequently, the recording/reproduction characteristics deteriorate.

The protective film to be used in the embodiment is formed to prevent the corrosion of the perpendicular magnetic recording layer, and prevent damage to the medium surface when a magnetic head comes in contact with the medium. Examples of the material of the protective film are materials containing C, $SiO_2$, and $ZrO_2$. The thickness of the protective film can be 1 to 10 nm. Since this makes it possible to decrease the distance between the head and medium, high-density recording is possible. Carbon can be classified into $sp^2$-bonded carbon (graphite) and $sp^3$-bonded carbon (diamond). $Sp^3$-bonded carbon is superior in durability and corrosion resistance, but inferior to graphite in surface smoothness because diamond is crystalline. A carbon film is normally formed by sputtering using a graphite target. This method forms amorphous carbon containing both $sp^2$-bonded carbon and $sp^3$-bonded carbon. Amorphous carbon having a high $sp^3$-bonded carbon ratio is called diamond-like carbon (DLC). DLC is superior in durability and corrosion resistance, and also superior in surface smoothness because it is amorphous. Therefore, DLC is used as a surface protective film of a magnetic recording medium. In the deposition of DLC performed by CVD (Chemical Vapor Deposition), DLC is produced by a chemical reaction by exciting and decomposing a source gas in a plasma. Therefore, it is possible to form DLC having a high $sp^3$-bonded carbon ratio by optimizing the conditions.

FIG. 2 is a partially exploded perspective view showing an example of the magnetic recording/reproduction apparatus according to the embodiment.

As shown in FIG. 2, a perpendicular magnetic recording apparatus 30 according to the embodiment includes a rectangular boxy housing 31 having an open upper end, and a top cover (not shown) that is screwed to the housing 31 by a plurality of screws and closes the upper-end opening of the housing.

The housing 31 accommodates, e.g., a perpendicular magnetic recording medium 32 according to the embodiment, a spindle motor 33 as a driving means for supporting and rotating the perpendicular magnetic recording medium 32, a magnetic head 34 for recording and reproducing magnetic signals with respect to the magnetic recording medium 32, a head actuator 35 that has a suspension on the distal end of which the magnetic head 34 is mounted, and supports the magnetic head 34 such that it freely moves with respect to the perpendicular magnetic recording medium 32, a rotating shaft 36 for rotatably supporting the head actuator 35, a voice coil motor 37 for rotating and positioning the head actuator 35 via the rotating shaft 36, and a head amplifier circuit 38.

EXAMPLES

The embodiment will be explained in more detail below by way of its examples.

Examples 1-6 & Comparative Examples 1-13

Nonmagnetic underlayers, magnetic recording layers, and implantation gases used in the examples were as follows.

Example 1

Nonmagnetic Underlayer (Ru/RuTi)+Magnetic Recording Layer (CoPtCr)+$N_2$ Gas

Example 2

Nonmagnetic Underlayer (Ru/RuCr)+Magnetic Recording Layer (CoPtCr)+$N_2$ Gas

Example 3

Nonmagnetic Underlayer (Ru/RuSi)+Magnetic Recording Layer (CoPtCr)+$N_2$ Gas

Example 4

Nonmagnetic Underlayer (Ru/RuTi)+Magnetic Recording Layer (CoPtCr)+$N_2$—He Gas

Example 5

Nonmagnetic Underlayer (Ru/RuTi)+Magnetic Recording Layer (CoPtCr)+$N_2$—$H_2$ Gas

Example 6

Nonmagnetic Underlayer (Ru/RuTi)+Magnetic Recording Layer (CoPtCr)+$N_2$—$B_2H_6$ Gas

Comparative Example 1

Nonmagnetic Underlayer (Ru/Ru)+Magnetic Recording Layer (CoPtCr)+$N_2$ Gas

Comparative Example 2

Nonmagnetic Underlayer (Ru/RuTi)+Magnetic Recording Layer (CoPtCr)+Ar Gas

Comparative Example 3

Nonmagnetic Underlayer (Ru/RuCr)+Magnetic Recording Layer (CoPtCr)+Ar Gas

Comparative Example 4

Nonmagnetic Underlayer (Ru/RuSi)+Magnetic Recording Layer (CoPtCr)+Ar Gas

Comparative Example 5

Nonmagnetic Underlayer (Ru/Ru)+Magnetic Recording Layer (CoPtCr—$TiO_2$)+$N_2$ Gas

Comparative Example 6

Nonmagnetic Underlayer (Ru/Ru)+Magnetic Recording Layer (CoPtCr—$Cr_2O_3$)+$N_2$ Gas

Comparative Example 7

Nonmagnetic Underlayer (Ru/Ru)+Magnetic Recording Layer (CoPtCr—$SiO_2$)+$N_2$ Gas

Comparative Example 8

Nonmagnetic Underlayer (Ru/Ru—$TiO_2$)+Magnetic Recording Layer (CoPtCr)+$N_2$ Gas

Comparative Example 9

Nonmagnetic Underlayer (Ru/Ru—$Cr_2O_3$)+Magnetic Recording Layer (CoPtCr)+$N_2$ Gas

Comparative Example 10

Nonmagnetic Underlayer (Ru/Ru—$SiO_2$)+Magnetic Recording Layer (CoPtCr)+$N_2$ Gas

Comparative Example 11

Nonmagnetic Underlayer (Ru/Ru—$TiO_2$)+Magnetic Recording Layer (CoPtCr—$TiO_2$)+$N_2$ Gas

Comparative Example 12

Nonmagnetic Underlayer (Ru/Ru—$Cr_2O_3$)+Magnetic Recording Layer (CoPtCr—$Cr_2O_3$)+$N_2$ Gas

Comparative Example 13

Nonmagnetic Underlayer (Ru/Ru—$SiO_2$)+Magnetic Recording Layer (CoPtCr—$SiO_2$)+$N_2$ Gas The manufacturing steps of a BPM according to Example 1 will be explained below with reference to FIGS. 3A, 3B, 3C, 3D, 3E, and 3F.

FIGS. 3A, 3B, 3C, 3D, 3E, and 3F are views showing an example of a method of manufacturing the magnetic recording medium according to the embodiment.

A glass substrate 21 (amorphous substrate MEL6 available from KONICA MINOLTA, diameter=2.5 inches) was placed in a deposition chamber of a DC magnetron sputtering apparatus (C-3010 available from ANELVA), and the deposition chamber was evacuated to an ultimate vacuum degree of $1 \times 10^{-5}$ Pa. On the substrate 21, 10-nm thick CrTi was formed as an adhesion layer (not shown). Then, 40-nm thick CoFeTaZr was deposited as a soft magnetic layer (not shown). NiW was formed to 10-nm thick as an orientation control layer (not shown). Subsequently, 10-nm thick Ru and 6-nm thick Ru-30 at % Ti were formed as a nonmagnetic underlayer 22. After that, 10-nm thick Co-20 at % Pt-10 at % Cr was formed as a perpendicular magnetic recording layer 23. Then, a 15-nm thick diamond-like carbon (DLC) protective layer 24 was formed by CVD.

A resist 25 was formed on the DLC (C) 24 by spin coating so as to have a thickness of 50 nm, thereby obtaining a stack as shown in FIG. 3A.

Subsequently, a stamper (not shown) having predetermined three-dimensional patterns was prepared. This stamper was manufactured through EB lithography, Ni electroforming, and injection molding. The stamper was set such that its three-dimensional surface faced the resist. The stamper was then imprinted on the resist, thereby transferring the three-dimensional patterns of the stamper onto the resist.

FIG. 4 is a front view showing, as the above-mentioned, three-dimensional patterns, examples of discrete track medium (DTM) three-dimensional patterns in which recording tracks and information for positioning a recording/reproduction head are recorded. FIG. 5 is a front view showing examples of bit patterned medium (BPM) three-dimensional patterns in which recording bits and information for positioning a recording/reproduction head are recorded.

Examples of the above-mentioned EB lithography patterns are patterns corresponding to a track pattern 11 formed in a data area and a servo area pattern 14 formed in a servo area and including a preamble address pattern 12 and burst pattern 13 as shown in FIG. 4, or patterns corresponding to a bit pattern 11' formed in the data area and the servo area pattern 14 formed in the servo area and including the preamble address pattern 12 and burst pattern 13 as shown in FIG. 5.

Note that a BPM was manufactured in the example.

Figure 3B:
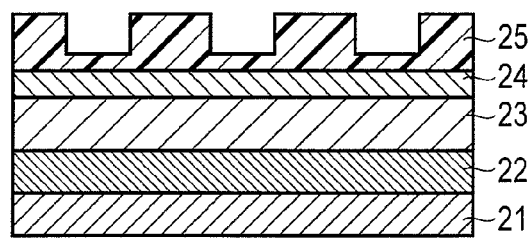

After that, the stamper was removed as shown in FIG. 3B.

Figure 3C:
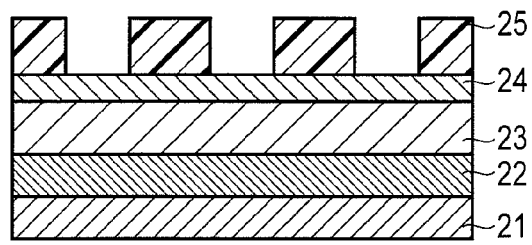
Figure 3D:
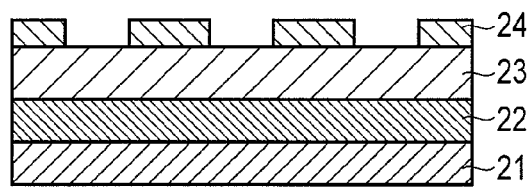

The resist residue remained on the bottoms of recesses of the three-dimensional patterns transferred onto the resist 25. Therefore, as shown in FIG. 3C, the resist residue in the recesses was removed by performing dry etching for an etching time of 60 sec by an inductively coupled plasma-reactive ion etching (ICP-RIE) apparatus by using $CF_4$ as a process gas at a chamber pressure of 0.1 Pa, a coil RF power of 100 W, and a platen (bias) RF power of 50 W, thereby exposing the surface of the DLC layer 24 in the recesses. Then, the patterned resist 25 was used as a mask to etch the DLC layer 24 by ion beam etching for an etching time of 5 sec by the ICP-RIE apparatus by using $O_2$ as a process gas at a chamber pressure of 0.1 Pa, a coil RF power of 100 W, and a platen RF power of 50 W, thereby transferring the patterns onto the DLC layer 24, and exposing the surface of the magnetic recording layer 23 in the recesses as shown in FIG. 3D.

Subsequently, non-recording portions were demagnetized as follows.

Figure 3E:
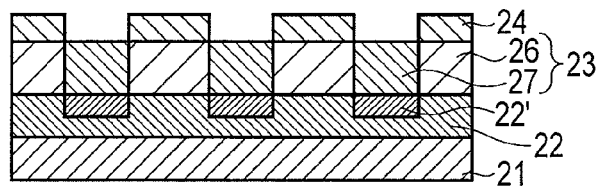
Figure 3F:
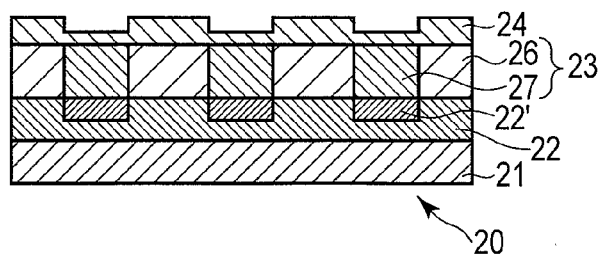

That is, as shown in FIG. 3E, nitrogen ions were implanted in the magnetic recording layer for a processing time of 100 sec by an ECR ion gun by using $N_2$ gas as an implantation gas at a gas pressure of 0.1 Pa, a microwave power of 1,000 W, and an acceleration voltage of 10 keV. After that, as shown in FIG. 3F, a 4-nm thick protective layer 23' was formed by depositing DLC by CVD, and coated with a lubricant (not shown) by dipping, thereby obtaining a patterned perpendicular magnetic recording medium according to the embodiment.

Similarly, perpendicular magnetic recording media of Examples 2 to 6 and Comparative Examples 1 to 13 were obtained by using combinations described in Tables 1 and 2 below as nonmagnetic underlayers, magnetic recording layers, and implantation gases.

The static magnetic characteristic, the element composition distribution in the sectional direction, and the recording/reproduction characteristic of each of Examples 1 to 6 and Comparative Examples 1 to 13 were measured.

To check the magnetization corresponding to the non-recording portions as the static magnetic characteristic, a medium in which the implantation process was performed on the entire surface of the magnetic recording layer without using any mask (a medium in which the entire surface was a non-recording portion) was separately manufactured, and magnetization was measured. The static magnetic characteristic was evaluated by using a vibrating sample magnetometer (VSM) available from Riken Denshi.

First, when using only Ru as the nonmagnetic underlayer as in Comparative Example 1, it was impossible to sufficiently demagnetize the non-recording portions even when $N_2$ ions were implanted in the Ru underlayer. This is so because when only $N_2$ ions were implanted, the implanted ion distribution had a spherical shape (or waterdrop shape), so defective deactivated regions were formed at the four corners. In addition, sufficient deactivation was impossible because almost no diffusion of ruthenium occurred.

Also, even when the RuTi, RuCr, and RuSi underlayers were used as in Comparative Examples 2 to 4, it was impossible to sufficiently demagnetize the non-recording portions when Ar was implanted. This is so because Ar was able to cause mixing, but defective deactivated regions were formed at the four corners because the mixing range had a spherical shape (or waterdrop shape).

Furthermore, as in Comparative Examples 5 to 13, deactivation was insufficient when Ti oxide, Cr oxide, and Si oxide were used in one or both of the recording layer and nonmagnetic underlayer for the following reason. That is, Ti oxide, Cr oxide, and Si oxide had large volumes and hence did not sufficiently diffuse. Therefore, a region where mixing occurred had a spherical shape (or waterdrop shape), and defective deactivated regions were formed at the four corners.

On the other hand, when $N_2$ gas was used as a deactivation gas and nitrogen was implanted so that the nonmagnetic underlayer and recording layer mixed with respect to RuTi, RuCr, or RuSi of the nonmagnetic underlayer as in Examples 1 to 3 of this application, it was possible to sufficiently demagnetize the non-recording portions.

The reason is as follows. After spherical (waterdrop-like) mixing occurred, nitrogen diffused through lattices. Ti diffused toward nitrogen, and deactivation advanced to the four corners of the spherical shape (waterdrop shape). Similarly, it was possible to sufficiently demagnetize the non-recording portions even when using RuTi as the nonmagnetic underlayer and using $N_2$—He, $N_2$—$H_2$, or $N_2$—$B_2H_6$ as the deactivation gas as in Examples 4 to 6.

Then, the element composition distributions of these media were measured by using a transmission electron microscope (TEM) and energy dispersive X-ray spectroscopy (TEM-EDX) in the substrate sectional direction, and the element chemical states of the media were measured by using X-ray photoelectron spectroscopy (XPS).

In the media of Examples 1 to 6, about 5 at % of titanium and nitrogen were observed in addition to cobalt, chromium, and platinum in the non-recording region of the perpendicular magnetic recording layer. Also, the non-recording region was amorphous. However, neither titanium nor nitrogen was observed in the recording region. Furthermore, in that region of the nonmagnetic underlayer which was in contact with the non-recording portions, cobalt, chromium, platinum, and nitrogen were observed in addition to ruthenium and titanium. However, in that region of the nonmagnetic underlayer which was in contact with the recording portions, no element except for ruthenium and titanium was detected.

On the other hand, in the media of Comparative Examples 1 to 13, diffusion more or less occurred between the nonmagnetic underlayer and recording layer, but the concentrations of cobalt, chromium, and platinum were high in portions corresponding to the four corners of the spherical (waterdrop-like) ion distribution, so the diffusion of the deactivation element was insufficient. Also, XPS analysis revealed that Ti in the non-recording region of the perpendicular magnetic recording layer was partially nitrided.

Finally, the recording/reproduction characteristic of each medium was evaluated by measuring the electromagnetic conversion characteristic by using read/write analyzer RWA1632 and spinstand S1701 MP available from GUZIK, U.S.A. The recording/reproduction characteristic was evaluated by using a head including a shielded magnetic pole as a single pole having a shield (the shield has a function of converging a magnetic flux generated from a magnetic head)

for write, and a TMR element as a reproduction unit. That is, the signal-to-noise ratio (SNR) of each medium was measured at a linear recording density of 1,400 kBPI as the recording frequency condition.

As shown in Tables 1 and 2, the media of Examples 1 to 6 each had an SNR higher than those of the media of Comparative Examples 1 to 13.

The characteristics of the media of the comparative examples were inferior probably because the implanted ion distribution had a spherical shape (waterdrop shape), so diffusion was insufficient in the surfacemost layer and lowermost layer, and magnetism remained.

On the other hand, in the media of this application as demonstrated in the examples, the deactivation element contained in the nonmagnetic underlayer diffused toward a small amount of nitrogen diffusing through lattices, in addition to magnetism deactivation caused by implantation ion mixing, so it was possible to sufficiently deactivate the magnetism from the surfacemost layer to the lowermost layer. In fact, in the media of Examples 1 to 6, the magnetization (Ms) in the non-recording portions was 0, i.e., there was no magnetic interference between recording bits. In the media of Comparative Examples 1 to 13, however, Ms remained in the non-recording portions, so magnetic interference occurred between recording bits, and noise increased.

In the embodiment, the deactivation element is added to the nonmagnetic underlayer in advance. Therefore, the magnetism of the magnetic recording layer can be deactivated by mixing the nonmagnetic underlayer and magnetic recording layer by ion implantation.

Nitrogen can be used as the implantation ion. In addition, hydrogen, helium, or boron having an atomic radius smaller than that of nitrogen can also be mixed in nitrogen. This allows deeper penetration of the implantation ions, and enables efficient mixing of the magnetic recording layer and nonmagnetic underlayer. As the deactivation element to be contained in the nonmagnetic underlayer, it is possible to select at least one element selected from the group consisting of Cr, Ti, and Si, as an element that readily forms a nitride. Ti is most favorable as the deactivation element. This makes it possible to efficiently deactivate the whole recording layer because the deactivation element in the nonmagnetic underlayer diffuses toward nitrogen, in addition to spherical (waterdrop-like) deactivation by ion implantation. Also, the magnetism of the non-recording portions can be deactivated more reliably because it is possible to sufficiently amorphousize the nonmagnetic underlayer in contact with the non-recording portions.

Note that a CoCrPt film was used as the magnetic recording layer in each of Examples 1 to 6, but the same improving effect was observed even when using an FePtCr film containing Fe instead of Co.

TABLE 1

|  |  | Nonmagnetic underlayer | Magnetic recording layer | Implantation gas | Non-recording portion Ms (emu/cc) | SNR (dB) |
| --- | --- | --- | --- | --- | --- | --- |
| Example | 1 | Ru/Ru—30 at % Ti | CoPtCr | $N_2$ | 0 | 15.4 |
|  | 2 | Ru/Ru—30 at % Cr | CoPtCr | $N_2$ | 0 | 13.1 |
|  | 3 | Ru/Ru—30 at % Si | CoPtCr | $N_2$ | 0 | 14.6 |
|  | 4 | Ru/Ru—30 at % Ti | CoPtCr | $N_2$—He | 0 | 16.1 |
|  | 5 | Ru/Ru—30 at % Ti | CoPtCr | $N_2$—$H_2$ | 0 | 15.5 |
|  | 6 | Ru/Ru—30 at % Ti | CoPtCr | $N_2$—$B_2H_6$ | 0 | 14.6 |

TABLE 2

|  |  | Nonmagnetic underlayer | Magnetic recording layer | Implantation gas | Non-recording portion Ms (emu/cc) | SNR (dB) |
| --- | --- | --- | --- | --- | --- | --- |
| Comparative Example | 1 | Ru | CoPtCr | $N_2$ | 230 | 8.0 |
|  | 2 | Ru/Ru—30 at % Ti | CoPtCr | Ar | 460 | 6.0 |
|  | 3 | Ru/Ru—30 at % Cr | CoPtCr | Ar | 480 | 5.6 |
|  | 4 | Ru/Ru—30 at % Si | CoPtCr | Ar | 470 | 5.2 |
|  | 5 | Ru/Ru | CoPtCr—10 mol % $TiO_2$ | $N_2$ | 210 | 8.8 |
|  | 6 | Ru/Ru | CoPtCr—10 mol % $Cr_2O_3$ | $N_2$ | 230 | 8.5 |
|  | 7 | Ru/Ru | CoPtCr—10 mol % $SiO_2$ | $N_2$ | 240 | 8.6 |
|  | 8 | Ru/Ru—30 mol % $TiO_2$ | CoPtCr | $N_2$ | 210 | 8.3 |
|  | 9 | Ru/Ru—30 mol % $Cr_2O_3$ | CoPtCr | $N_2$ | 240 | 8.2 |
|  | 10 | Ru/Ru—30 mol % $SiO_2$ | CoPtCr | $N_2$ | 250 | 8.1 |
|  | 11 | Ru/Ru—30 mol % $TiO_2$ | CoPtCr—10 mol % $TiO_2$ | $N_2$ | 290 | 7.8 |
|  | 12 | Ru/Ru—30 mol % $Cr_2O_3$ | CoPtCr—10 mol % $Cr_2O_3$ | $N_2$ | 280 | 7.7 |
|  | 13 | Ru/Ru—30 mol % $SiO_2$ | CoPtCr—10 mol % $SiO_2$ | $N_2$ | 270 | 7.9 |

Examples 7-11 & Comparative Example 14

The deactivation element concentrations in non-recording portions used in the examples and comparative example were as follows.

Example 7

Non-Recording Portions (Containing 5 at % of Ti)

Example 8

Non-Recording Portions (Containing 10 at % of Ti)

Example 9

Non-Recording Portions (Containing 15 at % of Ti)

Example 10

Non-Recording Portions (Containing 20 at % of Ti)

Example 11

Non-Recording Portions (Containing 25 at % of Ti)

Comparative Example 14

Non-Recording Portions (Containing 0 at % of Ti)

Perpendicular magnetic recording media of Examples 7 to 11 and Comparative Example 14 were obtained following the same procedures as in Example 1, except that 10-nm thick Ru and 6-nm thick Ru-50 at % Ti were formed as the nonmagnetic underlayer, and the titanium content in the non-recording portions in the magnetic recording layer was changed from 0 to 25 at % by changing the processing time of ion implantation as shown in Table 3 below.

The titanium and nitrogen contents in the magnetic recording layer of each medium were measured by TEM and TEM-EDX measurements in the substrate sectional direction. In the media of Examples 7 to 11 and Comparative Example 14, neither titanium nor nitrogen was measured in the recording portions. In the non-recording regions, however, titanium and nitrogen were observed in the media of Examples 7 to 11 as shown in Table 3.

The recording/reproduction characteristics and static magnetic characteristics of these media were measured in the same manner as in Example 1. As shown in Table 3, the media of Examples 7 to 11 each had a high SNR. Especially, when the titanium content in the non-recording portions was 5 at % or more, the Ms was almost 0, and the SNR was high.

In Table 3, the Ms was obtained as follows. That is, to check magnetization corresponding to the non-recording portions, a medium in which the implantation process was performed on the entire surface of the magnetic recording layer without using any mask (a medium in which the entire surface was a non-recording portion) was manufactured, and magnetization was measured.

Examples 12-16 & Comparative Example 15

The deactivation element concentrations in non-recording portions used in the examples and comparative example were as follows.

Example 12

Non-Recording Portions (Containing 15 at % of Cr)

Example 13

Non-Recording Portions (Containing 20 at % of Cr)

Example 14

Non-Recording Portions (Containing 25 at % of Cr)

Example 15

Non-Recording Portions (Containing 30 at % of Cr)

Example 16

Non-Recording Portions (Containing 35 at % of Cr)

Comparative Example 15

Non-Recording Portions (Containing 10 at % of Cr)

Perpendicular magnetic recording media of Examples 12 to 16 and Comparative Example 15 were obtained following the same procedures as in Example 1, except that 10-nm thick Ru and 6-nm thick Ru-50 at % Cr were formed as the non-magnetic underlayer, and the chromium content in the non-recording portions in the Co-20 at % Pt-10 at % Cr magnetic recording layer was changed from 10 to 35 at % by changing the processing time of ion implantation as shown in Table 4.

The chromium and nitrogen contents in the magnetic recording layer of each medium were measured by TEM and TEM-EDX measurements in the substrate sectional direction. In the media of Examples 12 to 16 and Comparative Example 15, 10 at % of chromium was observed and no nitrogen was observed in the recording portions. In the non-recording regions, however, chromium and nitrogen were observed in the media of Examples 12 to 16 as shown in Table 4.

TABLE 3

| | Nitrogen implantation processing time (sec) | Titanium content in non-recording portion (at %) | Nitrogen content in non-recording portion (at %) | Ms of non-recording portion (emu/cc) * | SNR (dB) |
|---|---|---|---|---|---|
| Example 7 | 30 | 5 | 10 | 5 | 13.0 |
| Example 8 | 50 | 10 | 15 | 0 | 14.1 |
| Example 9 | 100 | 15 | 20 | 0 | 15.3 |
| Example 10 | 200 | 20 | 25 | 0 | 15.0 |
| Example 11 | 300 | 25 | 30 | 0 | 14.7 |
| Comparative Example 14 | 10 | 0 | 5 | 450 | 3.2 |

The recording/reproduction characteristics and static magnetic characteristics of these media were measured in the same manner as in Example 1. As shown in Table 4, the media of Examples 12 to 16 each had a high SNR. Especially, when the difference between the chromium contents in the recording portions and non-recording portions was 5 at % or more, the Ms was almost 0, and the SNR was high.

TABLE 4

|  | Nitrogen implantation processing time (sec) | Chromium content in non-recording portion (at %) | Nitrogen content in non-recording portion (at %) | Ms of non-recording portion (emu/cc) | SNR (dB) |
| --- | --- | --- | --- | --- | --- |
| Example 12 | 30 | 15 | 10 | 7 | 11.5 |
| Example 13 | 50 | 20 | 15 | 0 | 12.1 |
| Example 14 | 100 | 25 | 20 | 0 | 13.3 |
| Example 15 | 200 | 30 | 25 | 0 | 13.0 |
| Example 16 | 300 | 35 | 30 | 0 | 12.7 |
| Comparative Example 15 | 10 | 10 | 5 | 480 | 3.3 |

In Table 4, the Ms was obtained as follows. That is, to check magnetization corresponding to the non-recording portions, a medium in which the implantation process was performed on the entire surface of the magnetic recording layer without using any mask (a medium in which the entire surface was a non-recording portion) was manufactured, and magnetization was measured.

Examples 17-20

The deactivation element concentrations in non-recording portions used in the examples were as follows.

Example 17

Non-Recording Portions (Containing 5 at % of $N_2$)

Example 18

Non-Recording Portions (Containing 10 at % of $N_2$)

Example 19

Non-Recording Portions (Containing 20 at % of $N_2$)

Example 20

Non-Recording Portions (Containing 30 at % of $N_2$)

Perpendicular magnetic recording media of Examples 17 to 20 were obtained following the same procedures as in Example 1, except that the nitrogen content in the non-recording portions in the magnetic recording layer was changed from 5 to 30 at % by changing the ion implantation gas pressure as shown in Table 5 below.

The nitrogen content in the magnetic recording layer of each medium was measured by TEM and TEM-EDX measurements in the substrate sectional direction. In the media of Examples 17 to 20, no nitrogen was observed in the recording portions. In the non-recording regions, however, nitrogen was observed in the media of Examples 17 to 20 as shown in Table 5.

The recording/reproduction characteristics and static magnetic characteristics of these media were measured in the same manner as in Example 1. As shown in Table 5, the media of Examples 17 to 20 each had a high SNR. Especially, when the nitrogen content in the non-recording portions was 10 at % or more, the Ms was almost 0, and the SNR was high.

Note that when the nitrogen content in the non-recording portions exceeded 50 at %, the nonmagnetic layer expanded.

TABLE 5

|  | Nitrogen implantation gas pressure (Pa) | Nitrogen content in non-recording portion (at %) | Ms of non-recording portion (emu/cc) | SNR (dB) |
| --- | --- | --- | --- | --- |
| Example 17 | 0.01 | 5 | 50 | 11.5 |
| Example 18 | 0.05 | 10 | 0 | 14.1 |
| Example 19 | 0.5 | 20 | 0 | 15.3 |
| Example 20 | 3 | 30 | 0 | 15.0 |

In Table 5, the Ms was obtained as follows. That is, to check magnetization corresponding to the non-recording portions, a medium in which the implantation process was performed on the entire surface of the magnetic recording layer without using any mask (a medium in which the entire surface was a non-recording portion) was manufactured, and magnetization was measured.

Examples 21-24 & Comparative Example 16

The deactivation element concentrations in non-recording portions used in the examples and comparative example were as follows.

Example 21

Nonmagnetic Underlayer Immediately Below Non-Recording Portions (Containing 45 at % of Si)

Example 22

Nonmagnetic Underlayer Immediately Below Non-Recording Portions (Containing 40 at % of Si)

Example 23

Nonmagnetic Underlayer Immediately Below Non-Recording Portions (Containing 30 at % of Si)

Example 24

Nonmagnetic Underlayer Immediately Below Non-Recording Portions (Containing 25 at % of Si)

Comparative Example 16

Nonmagnetic Underlayer Immediately Below Non-Recording Portions (Containing 50 at % of Si)

Perpendicular magnetic recording media of Examples 21 to 24 and Comparative Example 16 were obtained following the same procedures as in Example 1, except that 10-nm thick Ru and 6-nm thick Ru-50 at % Si were formed as the nonmagnetic underlayer, and the silicon content in the nonmagnetic underlayer immediately below the non-recording portions was changed from 50 to 25 at % by changing the processing time of ion implantation as shown in Table 6 below.

The silicon contents in the nonmagnetic underlayer immediately below the non-recording portions and recording portions of each medium were measured by TEM and TEM-EDX measurements in the substrate sectional direction. In the media of Examples 21 to 24 and Comparative Example 16, the silicon content remained unchanged in the recording portions. In the non-recording regions, however, the silicon content changed in the media of Examples 21 to 24 as shown in Table 6 below.

The recording/reproduction characteristics and static magnetic characteristics of these media were measured in the same manner as in Example 1. As shown in Table 6, the media of Examples 21 to 24 each had a high SNR. Especially, when the difference between the silicon contents in the nonmagnetic underlayer immediately below the non-recording portions and recording portions was 5 at % or more, the Ms in the non-recording portions was almost 0, and the SNR was high.

TABLE 6

|  | Nitrogen implantation processing time (sec) | Si content in nonmagnetic underlayer immediately below the non-recording portions (at %) | Si content in nonmagnetic underlayer immediately below the recording portions (at %) | Ms of non-recording portion (emu/cc) | SNR (dB) |
| --- | --- | --- | --- | --- | --- |
| Example 21 | 30 | 45 | 50 | 8 | 12.8 |
| Example 22 | 50 | 40 | 50 | 0 | 13.8 |
| Example 23 | 200 | 30 | 50 | 0 | 14.3 |
| Example 24 | 300 | 25 | 50 | 0 | 14.0 |
| Comparative Example 16 | 10 | 50 | 50 | 410 | 4.0 |

In Table 6, the Ms was obtained as follows. That is, to check magnetization corresponding to the non-recording portions, a medium in which the implantation process was performed on the entire surface of the magnetic recording layer without using any mask (a medium in which the entire surface was a non-recording portion) was manufactured, and magnetization was measured.

In the embodiment and its examples described above, the deactivation element is added to the nonmagnetic underlayer in advance. This makes it possible to deactivate the magnetism of the magnetic recording layer by mixing the nonmagnetic underlayer and magnetic recording layer during ion implantation. In addition, favorable recording/reproduction characteristics are obtained because the perpendicular magnetic recording layer is damaged little when it is processed into predetermined patterns.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a nonmagnetic substrate;
   a nonmagnetic underlayer consisting of ruthenium and 10 to 50 at % of at least one element of titanium and silicon;
   a perpendicular magnetic recording layer formed in contact with the nonmagnetic underlayer and containing platinum and at least one of iron and cobalt;
   a mixed region of the nonmagnetic underlayer, in which at least some components of the perpendicular magnetic recording layer are mixed, containing ruthenium, nitrogen, and platinum, at least one of iron and cobalt, and at least one element selected from the group consisting of titanium and silicon; and
   a non-recording portion containing nitrogen and platinum, at least one of iron and cobalt, and at least one element selected from the group consisting of titanium and silicon,
   wherein a content of at least one element selected from the group consisting of titanium and silicon in the mixed region of the nonmagnetic underlayer is smaller by not less than 5 at % than a content of the element in the nonmagnetic underlayer, and
   wherein the mixed region of the nonmagnetic underlayer and the non-recording portion are demagnetized by forming a mask layer having patterns regularly arranged in a longitudinal direction on the perpendicular magnetic recording layer, and irradiating gas ion to the perpendicular magnetic recording layer and the nonmagnetic underlayer which are not covered with the mask layer using nitrogen gas or a mixture of nitrogen gas and at least one gas selected from the group consisting of helium, hydrogen, and $B_2H_6$, and mixing at least some components of the perpendicular magnetic recording layer and some components of the nonmagnetic underlayer in a thickness direction.

2. The medium of claim 1, wherein the non-recording portion and the mixed region each contain titanium.

3. The medium of claim 1, wherein a content of at least one element of titanium and silicon in the non-recording portion is larger by not less than 5 at % than a content of the element in the recording portion.

4. The medium of claim 1, wherein the non-recording portion contains at least one nitride of titanium nitride and silicon nitride.

5. The medium of claim 1, wherein the non-recording portion contains not less than 10 at % of nitrogen.

6. A magnetic recording medium manufacturing method comprising:
   forming, on a nonmagnetic substrate, a nonmagnetic underlayer consisting of ruthenium and 10 to 50 at % of at least one element of titanium and silicon;
   forming a perpendicular magnetic recording layer containing platinum and at least one of iron and cobalt, such that the perpendicular magnetic recording layer is in contact with the nonmagnetic underlayer;
   forming, on the perpendicular magnetic recording layer, a mask layer having patterns regularly arranged in a longitudinal direction; and
   performing gas ion irradiation by using nitrogen gas or a mixture of nitrogen gas and at least one gas selected from the group consisting of helium, hydrogen, and $B_2H_6$,
   thereby forming a recording portion having regularly arranged patterns and a demagnetized non-recording portion in the magnetic recording layer by demagnetizing a region not covered with the mask layer by mixing the magnetic recording layer and the nonmagnetic underlayer in the region in a thickness direction, and forming, under the non-recording portion, a mixed region of the nonmagnetic underlayer in which at least some components of the perpendicular magnetic recording layer are mixed,
   wherein the mixed region comprises ruthenium, nitrogen, and platinum, at least one of iron and cobalt, and at least one element selected from the group consisting of titanium and silicon,
   wherein a content of at least one element selected from the group consisting of titanium and silicon in the mixed region is smaller by not less than 5 at % than a content of the element in the nonmagnetic underlayer, and
   wherein the non-recording portion contains nitrogen and platinum, at least one of iron and cobalt, and at least one element selected from the group consisting of titanium and silicon.

7. A magnetic recording/reproduction apparatus comprising:
   a perpendicular magnetic recording medium comprising a nonmagnetic substrate, a nonmagnetic underlayer consisting of ruthenium and 10 to 50 at % of at least one element of titanium and silicon, a perpendicular magnetic recording layer formed in contact with the nonmagnetic underlayer and containing platinum and at least one of iron and cobalt stacked on the nonmagnetic substrate, a mixed region of the nonmagnetic underlayer, in which at least some components of the perpendicular magnetic recording layer are mixed, which contains ruthenium, nitrogen, and platinum, at least one of iron and cobalt, and at least one element selected from the group consisting of titanium and silicon, a non-recording portion containing nitrogen and platinum, at least one of iron and cobalt, and at least one element selected from the group consisting of titanium and silicon,
   wherein a content of at least one element selected from the group consisting of titanium and silicon in the mixed region of the nonmagnetic underlayer is smaller by not less than 5 at % than a content of the element in the nonmagnetic underlayer, and
   wherein the mixed region of the nonmagnetic underlayer and the non-recording portion are demagnetized by forming a mask layer having patterns regularly arranged in a longitudinal direction on the perpendicular magnetic recording layer, irradiating gas ion to the perpendicular magnetic recording layer and the nonmagnetic underlayer which are not covered with the mask layer using nitrogen gas or a mixture of nitrogen gas and at least one gas selected from the group consisting of helium, hydrogen, and $B_2H_6$, and mixing at least some components of the perpendicular magnetic recording layer and some components of the nonmagnetic underlayer in a thickness direction;
   a mechanism configured to support and rotate the perpendicular magnetic recording medium;
   a magnetic head comprising an element configured to record information on the perpendicular magnetic recording medium, and an element configured to reproduce recorded information; and
   a carriage assembly configured to support the magnetic head such that the magnetic head freely moves with respect to the perpendicular magnetic recording medium.

8. The apparatus of claim 7, wherein the non-recording portion and the mixed region each contain titanium.

9. The apparatus of claim 7, wherein a content of at least one element of titanium and silicon in the non-recording portion is larger by not less than 5 at % than a content of the element in the recording portion.

10. The apparatus of claim 7, wherein the non-recording portion contains at least one nitride of titanium nitride and silicon nitride.

11. The apparatus of claim 7, wherein the non-recording portion contains not less than 10 at % of nitrogen.

* * * * *